United States Patent
Skahan, Jr. et al.

(10) Patent No.: US 7,139,346 B2
(45) Date of Patent: Nov. 21, 2006

(54) MOBILE NETWORK TIME DISTRIBUTION

(75) Inventors: Vincent D. Skahan, Jr., Federal Way, WA (US); Terry L. Davis, Issaquah, WA (US); Gary V. Stephenson, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 795 days.

(21) Appl. No.: 10/216,607

(22) Filed: Aug. 9, 2002

(65) Prior Publication Data

US 2004/0028162 A1    Feb. 12, 2004

(51) Int. Cl.
 *H04L 7/00* (2006.01)
(52) U.S. Cl. .................................. 375/356
(58) Field of Classification Search ............. 375/356, 375/354, 377; 340/318, 286.01; 370/395.62, 370/395.61, 395.6, 395.1, 357, 351; 455/502, 455/501, 500, 39
See application file for complete search history.

(56) References Cited

U.S. PATENT DOCUMENTS

| 6,023,769 | A | 2/2000 | Gonzalez |
| 6,665,316 | B1 * | 12/2003 | Eidson ...................... 370/509 |
| 6,915,353 | B1 * | 7/2005 | Burkes et al. .............. 709/248 |

OTHER PUBLICATIONS

Ping, Yuan, Julie Schlembach, Anders Skoe, Edward Knightly, "Design and implementation of scalable edge-based admission control", Computer Networks 37 (2001), pp. 507-518.
Precise Synchronization of Computer Networks: Network Time Protocol (NTP) for TCP/IP, Truetime Application Note, No. 23, pp. 1-3.
David L. Mills, "Internet Time Synchronization: The Network Time Protocol", IEEE Transactions on Communications, vol. 39, No. 10, pp. 1482-1493.
International Search Report; PCT/US03/23856; mailed Jan. 8, 2004.

* cited by examiner

*Primary Examiner*—Pankaj Kumar
(74) *Attorney, Agent, or Firm*—Harness Dickey & Pierce P.L.C.

(57) ABSTRACT

A method for synchronizing a time architecture of a mobile network that includes a plurality of network components, each having a time subsystem clock that is updated using a network time protocol (NTP) program. The method includes operating the components in a hierarchical fashion and booting up all the network components such that execution of a NTP sub-program for making small incremental changes to the each component time subsystem clock is delayed. Additionally, the method includes iteratively executing a NTP sub-program for making large changes to each component time system clock until each component time sub-system clock establishes an initial synchronization with a parent component time sub-system clock. Furthermore, the method includes iteratively executing the NTP sub-program for making small incremental changes once initial synchronization is established such that each component time sub-system clock maintains synchronization with the parent component time sub-system clock.

17 Claims, 2 Drawing Sheets

MOBILE NETWORK TIME DISTRIBUTION

FIELD OF INVENTION

The invention relates generally to networks on board mobile platforms. More specifically, the invention relates to setting and synchronizing the correct time between all the components within a network on a mobile platform.

BACKGROUND OF THE INVENTION

Local area networks (LANs) and other computer networks are becoming more common place on mobile platforms, e.g. aircraft, ships and trains. Architecturally, mobile networks are very similar to ground based, or terrestrial, networks. Mobile networks typically include servers, databases and other storage mediums, processors, and client systems, as do typical terrestrial network. Given the mobile nature of mobile networks, they are typically connected to a terrestrial network via a wireless communication system such as a satellite network. Therefore, in addition to the standard components, mobile networks typically include transmit and receive cards that allow the mobile network to communicate with terrestrial networks that include similar transmit and receive card.

Although more and more mobile platforms are equipped with mobile networks, it is difficult to provide a level of functionality within mobile networks similar to the level of functionality of terrestrial networks. A major reason for this lower level of functionality in mobile networks is that their functionality is dependent on communication with terrestrial networks. Since mobile platforms are not stationary, a constant communication link to a terrestrial network is difficult to maintain. For example, an aircraft moving at 500 miles per hour and using satellite links to a terrestrial network will have to occasionally switch between more than one satellite to maintain communication with the ground network. This switching will cause delays in the transfer of data from the ground network to the mobile network. Additionally, there will be inherent delays caused by the long distances over which the data is transmitted.

Further diminishment of functionality is caused when various components of the mobile network attempt to operate having time sub-systems of the components set to the incorrect time and/or out of synchronization with time sub-systems of the other component. Even further functionality is lost when the mobile network time services are out of synchronization with the terrestrial network with which it is communicating. On a mobile platform such as an aircraft, power is typically applied to all mobile network components simultaneously and all components attempt to boot up at the same time. Most components do not have battery backed up time features. Therefore, as the components simultaneously boot up, each will boot up using the time from its respective time subsystem, which will likely vary widely from component to component.

To establish the correct time each component typically utilizes network time protocol (NTP) software that attempts to correct the time of a component so it matches the universal time coordinated (UTC) time. At initialization of a component, a NTP sub-program, NTPD, is executed that requests the time from a 'Parent' component of the requesting component. The 'Parent' component is the next component between the requesting component and a mobile network server. NTPD then adjusts the time of the requesting component to bring it closer to the 'Parent' time. NTPD will adjust the requesting component time periodically until that component time matches the 'Parent' time. The 'Parent' component also runs NTPD, thereby requesting and updating time from its 'Parent' component.

This hierarchical process is reiterated for each component within the mobile network until time is requested from the mobile network server, which has battery backed up time that maintains reasonably accurate time. However, upon establishing a two-way communication link with the terrestrial network, the mobile network server requests a time update from the terrestrial network server, which maintains UTC time via a GPS time receiver.

Although NTPD attempts to update the time of each component to the UTC time using the hierarchical process, NTPD only makes very small adjustments, e.g. microseconds, to the time of the requesting component. Therefore, if the requesting component time and the 'Parent' time have a large differential it will take a very long time for the 'Child' component time to match the 'Parent' time. To correct large time differentials, each component runs a NTP sub-program, ntpdate, which will make larger time adjustments to the requesting component's time subsystem. However, ntpdate is executed only once upon boot up of a component, after which NTPD is periodically executed regardless of whether ntpdate was successful in adjusting the time to UTC time.

Thus, it would be desirable to compensate for these large time differentials and accurately synchronize both the time architecture as well as the time distribution between components of the mobile network, and between the mobile network and the terrestrial network.

BRIEF SUMMARY OF THE INVENTION

In one preferred embodiment of the present invention, a method is provided for synchronizing a time architecture of a mobile network. The mobile network includes a plurality of network components that each include a time subsystem clock that is updated using a network time protocol (NTP) program. The method includes operating the components in a hierarchical fashion and booting up all the network components such that execution of a NTP sub-program for making small incremental changes to the each component time subsystem clock is delayed. Additionally, the method includes iteratively executing a NTP sub-program for making large changes to each component time system clock until each component time sub-system clock establishes an initial synchronization with a parent component time sub-system clock. Furthermore, the method includes iteratively executing the NTP sub-program for making small incremental changes once initial synchronization is established such that each component time sub-system clock maintains synchronization with the parent component time sub-system clock.

In another preferred embodiment of the present invention, a system is provided that synchronizes a time architecture of a mobile network. The system includes a terrestrial network that includes a satellite gateway network time protocol (NTP) server having a time sub-system clock synchronized with a master clock. The system also includes a mobile network comprising a plurality of components operating in a hierarchical fashion. One of the components is a control system (CS) NTP server adapted to communicate with the satellite gateway NTP server. Each of the components comprises a time sub-system clock and is adapted to boot up such that execution of a NTP sub-program for making small incremental changes to the component time sub-system clock is delayed. Each component then establishes an initial synchronization of its component time sub-system clock with a respective parent component time sub-system clock.

Additionally, each component is adapted to and maintain synchronization of its component time sub-system clock with the respective parent component time sub-system clock once the initial synchronization is established.

BRIEF DESCRIPTION OF THE DRAWINGS

The present invention will become more fully understood from the detailed description and accompanying drawings, wherein.

DETAILED DESCRIPTION OF THE INVENTION

Figure 1:
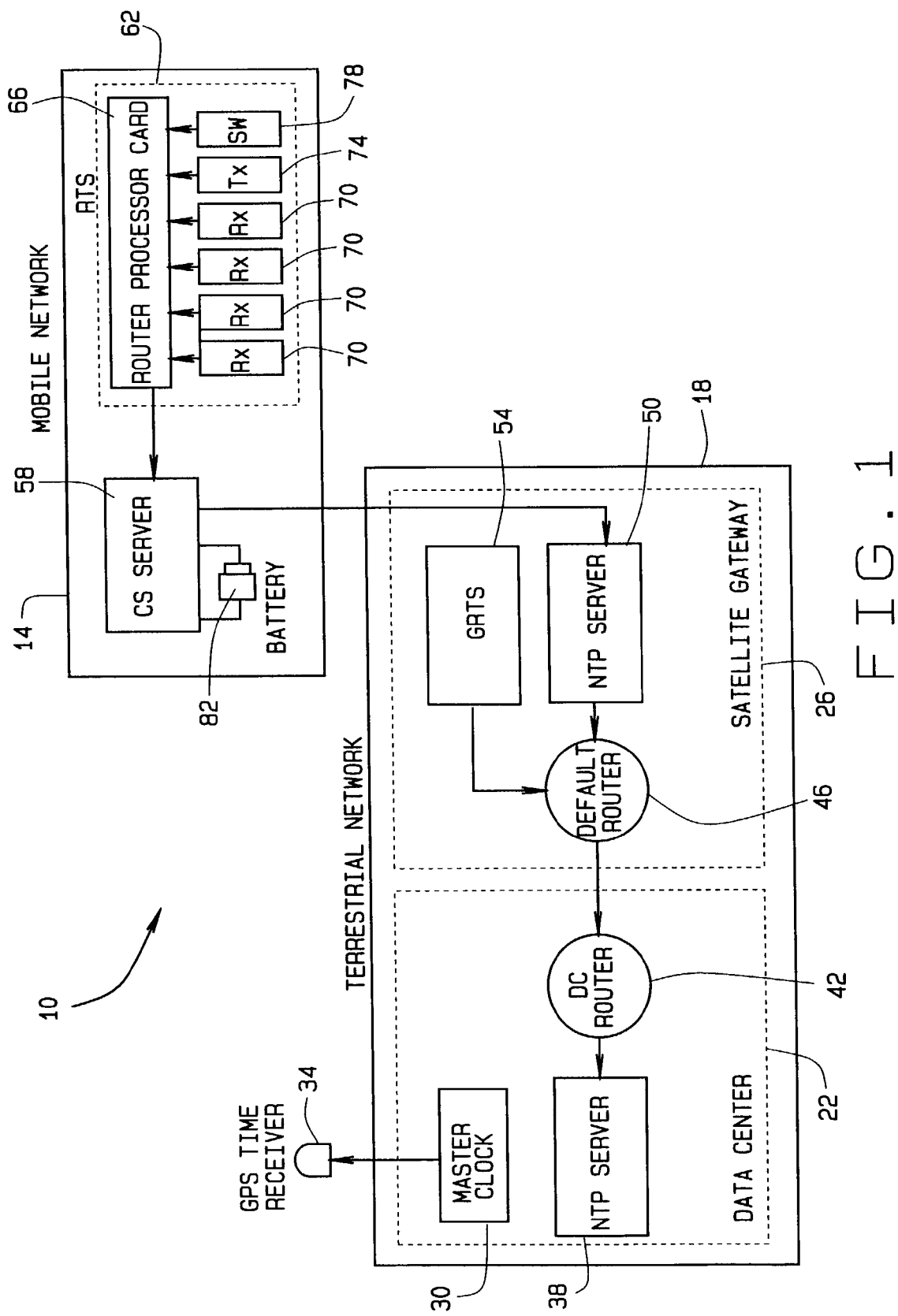
FIG. 1 is a block diagram of a system for synchronizing the time distribution of a mobile network, in accordance with a preferred embodiment of the present invention.

FIG. 1 is a block diagram of a system 10 for synchronizing the time distribution and architecture of a mobile network 14, in accordance with a preferred embodiment of the present invention. System 10 includes the mobile network 14 and a terrestrial network 18. Networks 14 and 18 are computer networks, such as local area networks (LANs), that interconnect a plurality of computer related components, for example servers, routers, and processors. The terrestrial network 18 includes a data center 22 and a satellite gateway 26. A master clock 30 in the data center 22 serves a the central reference point of network time in the terrestrial network. Master clock 30 is locked to universal time coordinated (UTC) time via a global positioning system (GPS) time receiver 34. Terrestrial network 22 also includes a data center network time protocol (NTP) server 38 and a data center (DC) router 42. The data center NTP server 38 utilizes a UTC time reference acquired from master clock 30, and the DC router 42 utilizes a UTC time reference acquired from the data center NTP server 38.

The satellite gateway 26 includes a default router 46 that receives a UTC time reference from DC router 42, a satellite gateway NTP server 50 and a ground receive transmit sub-system (GTRS) 54. The satellite gateway NTP server 50 and the GRTS 54 both receive a UTC time reference from default router 46. The data center NTP server 38, satellite gateway server 50, DC router 42, default router 46 and GRTS 54, sometime generally referred to herein as the terrestrial network 18 components, all include a time sub-system (not shown). Each terrestrial network 18 component time sub-system includes a clock (not shown) that utilizes the UTC time reference acquired by each component, as described above, to update the time sub-system clock. Additionally, all terrestrial network 18 components operate in a hierarchical fashion wherein there is Child-Parent relationship between the components such that a child component will query a parent component for information, as described above in reference to UTC time. Each terrestrial network 18 component can be either a child component, a parent component, or both.

Each terrestrial network 18 component utilizes network time protocol (NTP) software for updating its respective time sub-system clock. NTP software is commonly used in the art for sequencing the time sub-systems clocks of network components. The NTP software utilizes the hierarchical relationship between components such that each component requests the UTC time reference, for which to update its respective time sub-system clock, from its respective parent component. Generally, once during the boot up sequence each component executes a NTP sub-program, known as ntpdate, for making large changes to the time sub-system clock. Once ntpdate has been executed, each component iteratively executes another NTP sub-program, known as NTP Daemon (NTPD), for making small changes to the time sub-system clock.

The mobile network 14 is a network located on any mobile platform such as a bus, train, ship or aircraft. For exemplary purposes only, the mobile network 14 will be referenced herein as residing on an aircraft. However, the scope of invention should not be limited only to application of mobile networks onboard aircraft. Mobile network 14 includes a control sub-system (CS) server 58 and a receive transmit sub-system (RTS) 62 that receives and transmits data and information to and from terrestrial network 18. The CS server 58 utilizes a UTC time reference acquired from satellite gateway NTP server 50. The RTS 62 includes at least one router processor card (RPC) 66, a plurality of data receive (RX) cards 70, at least one data transmit (TX) card 74 and at least one embedded switch 78. The RPC 66 receives a UTC time reference from CS server 58, while RX cards 70 and TX card 74 receive a UTC time reference from RPC 66. The embedded switch 78 is not a consumer of time. The CS server 58 includes a battery 82 for maintaining battery back-up time when CS server 58 is powered down.

Similar to the terrestrial network 18 components, the CS server 58, RPC 66, RX cards 70 and TX card 74, sometime generally referred to herein as the mobile network 14 components, all include a time sub-system (not shown). Each mobile network 14 component time sub-system includes a clock (not shown) that utilizes the UTC time reference acquired by each component, as described above, to update the time sub-system clock. Additionally, all mobile network 14 components operate in a hierarchical fashion wherein there is Child-Parent relationship between the components such that a child component will query a parent component for information, as described above in reference to UTC time. Each mobile network 14 component can be either a child component, a parent component, or both. Furthermore, each mobile network 14 component utilizes NTP software for updating its respective time sub-system clock. Daemon (NTPD), for making small changes to the time sub-system clock.

However, mobile network 14 is only supplied with power when the mobile platform on which it resides, e.g. an aircraft, is operating. Thus, mobile network 14 is powered down and up according to the operational status of the mobile platform on which mobile network 14 resides. When power is applied to mobile network 14, power is applied to all the mobile network 14 components simultaneously. Since RX cards 70 and TX card 74 do not include batteries to retain time in their respective time sub-system clocks when the cards are shut down, their respective time sub-system clocks must be updated to the correct UTC time when mobile network 14 is powered up, via the NTP software. During the boot up sequence, due to the hierarchical relationship between all the mobile network 14 components, RX cards 70 and TX card 74, as child components, query RPC 66, as a parent component, for information. Therefore, at boot up, RX cards 70 and TX card 74 execute ntpdate, which requests an update time from RPC 66. However, RPC 66, as a child component, may not have established network communication yet with the CS server 58, as a parent component. Therefore, the time provided by RPC 66 to RX cards 70 and TX card 74 may not be correct.

Once RPC 66 has set up network communications with CS server 58, RPC 66 will update its time sub-system clock, via ntpdate, to a time received from CS server 58 that is based on the battery backed up time in the CS server 58 time sub-system clock. Due to the lack of battery backed-up time in RPC 66, the time in the RPC 66 time sub-system clock will typically be considerably different from the time received from CS server 58 resulting in a large delta jump in time. The time will typically take another jump when two-way communications between mobile network 14 and the terrestrial network 18 is established and CS server 58 uses the NTP software to update its time sub-system clock based on satellite gateway NTP server 50. ntpdate is adapted to update the time sub-system of a mobile or terrestrial network component when these large jumps in time occur. However, ntpdate is only executed once during boot up of each mobile and terrestrial network component. After which NTPD is iteratively executed to make small adjustments to the time sub-system clocks, thereby maintaining accurately updated time and time synchronization between the mobile network 14 components, between terrestrial network 18 components, and between mobile network 14 and terrestrial network 18. Therefore, if ntpdate fails to accurately update the time sub-system clock of a mobile or terrestrial network component because a child component is requesting time from a parent component that has not yet achieved accurate time, the large time discrepancy will remain. Also, since NTPD only makes small adjustments to time sub-system clocks, e.g. only a few millisecond adjustments, NTPD will not compensate for the large time discrepancy.

Figure 2:
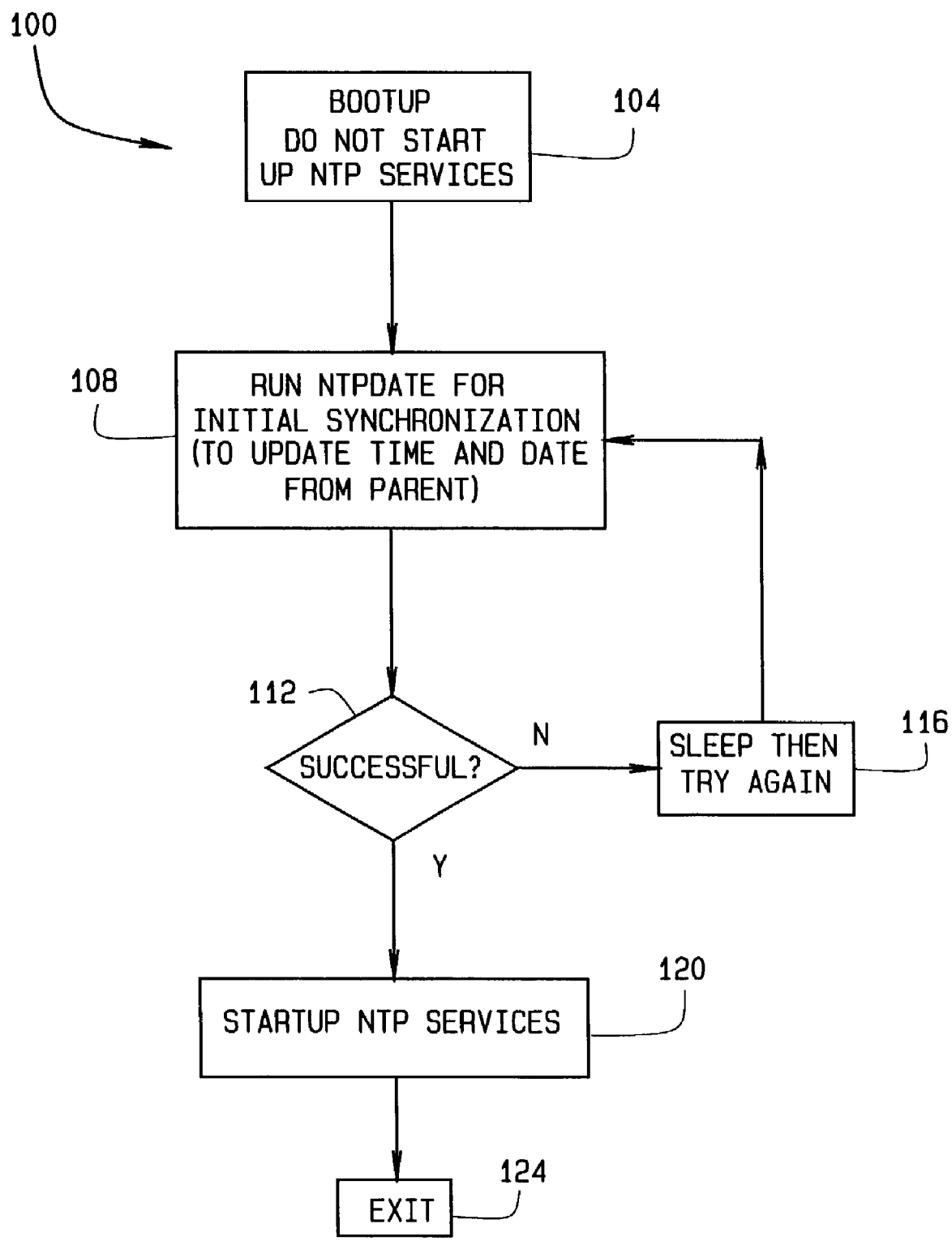
FIG. 2 is flow chart illustrating steps of an algorithm executed by each component of the mobile network and a terrestrial network shown in FIG. 1 during a boot sequence, in accordance with a preferred embodiment of the present invention.

FIG. 2 is flow chart 100 illustrating steps of a control algorithm executed by each component of the mobile network 14 and terrestrial network 18 (shown in FIG. 1) during a boot sequence, in accordance with a preferred method of the present invention. The control algorithm controls the execution of the NTP software. This ensures that inaccurate adjustments to the time sub-system clocks of the mobile network 14 components and the terrestrial network 18 components will not occur when there is a large time differential between a child component time sub-system clock and the parent component time sub-system clock.

With respect to mobile network 14, when mobile network 14 is powered up and each of the mobile network 14 components begin to boot up the control algorithm delays the execution of NTP services, e.g. NTPD, as indicated at step 104. Each mobile network 14 component then executes ntpdate for initial synchronization of the respective time sub-system clocks, as indicated at step 108. Thus, each mobile network 14 component queries its respective parent component for a date and time update. The control algorithm then determines whether the execution of ntpdate successfully updated the time sub-system clock of the requesting, or child, component, as indicated at step 112. If the execution of ntpdate is not successful for any reason, for example the parent component had not yet initialized and established the correct UTC time, the control algorithm pauses the boot up sequence of the child component for a predetermined amount of time, for example 1 minute, then executes ntpdate again, as indicated at step 116. This loop of delaying the boot sequence and re-executing ntpdate is reiterated until ntpdate successfully updates the time sub-system clock of the mobile network 14 component. Once ntpdate is successfully executed, the control algorithm allows the startup of NTP services, e.g. iterative execution of NTPD to begin, thereby maintaining accurate time in the component time sub-system clock, as indicated at step 120. After the component begins execution of NTPD, the control algorithm is exited, as indicated at step 124.

The control algorithm is similarly executed by each of the terrestrial network 18 components when terrestrial network 18 is powered up. Thus, the control algorithm allows for all the mobile network 14 components to be powered on simultaneously, or in random order, and boot up such that the time sub-system clocks of all the mobile network 14 components are synchronized with each other. Additionally, the control algorithm ensures that all terrestrial network 18 components boot such that all of their respective time sub-system clocks are synchronized. Furthermore, the control algorithm ensures that the mobile network 14 components are synchronized with the terrestrial network 18 components.

In another preferred embodiment, mobile network 14 is serverless, such that CS server 58 is eliminated. In this serverless architecture embodiment RPC 66 is the mobile network 14 component that queries satellite gateway NTP server 50 for time, as opposed to CS server 58 querying satellite gateway NTP server 50, as described above. Thus, in the case that mobile network 14 has a serverless architecture, the system 10 (shown in FIG. 1) and the control algorithm function in the same manner as described above except terrestrial NTP server 50 is the parent component to RPC 66 instead of CS server 58.

While the invention has been described in terms of various specific embodiments, those skilled in the art will recognize that the invention can be practiced with modification within the spirit and scope of the claims.

What is claimed is:

1. A method for synchronizing time distribution of a mobile network that includes a plurality of network components operating in a hierarchical fashion, wherein each said component includes a time sub-system clock that is updated using a network time protocol (NTP) program included in each said component, and wherein a first NTP sub-program is used for making incremental changes to each said component time sub-system clock, said method comprising:

booting up all of said network components such that execution of said first NTP sub-program is delayed;

executing a second NTP sub-program for making greater than incremental changes to each said component time sub-system clock to initially synchronize each said component time sub-system clock with a respective parent component time sub-system clock; and maintaining synchronization of each said component time sub-system clock with said respective parent component time sub-system clock utilizing said first NTP sub-routine.

2. The method of claim 1, wherein initially synchronizing each said component further comprises:

remaining idle for a predetermined amount of time if execution of said second NTP sub-program fails to initially synchronize each said component time sub-system clock with said respective parent component time sub-system clock; and repeating the execution of said second NTP sub-program after remaining idle for the predetermined amount of time.

3. The method of claim 2, wherein initially synchronizing each said component further comprises repeating the remaining idle for a predetermined amount of time and the executing said second NTP sub-program after remaining idle for the predetermined amount of time until initial synchronization with said respective parent component time sub-system clock is accomplished.

4. The method of claim 3, wherein maintaining synchronization of each said component time sub-system clock with said respective parent component time sub-system clock comprises iteratively executing said first NTP sub-program once initial synchronization with said respective parent component time sub-system clock has been accomplished.

5. The method of claim 1, wherein initially maintaining synchronization of each said component time sub-system clock with said respective parent component time sub-system clock comprises iteratively executing said first NTP sub-program if the initial synchronization is successful.

6. The method of claim 1, wherein maintaining synchronization of each said component time sub-system clock with said respective parent component time sub-system clock comprises iteratively executing said first NTP sub-program.

7. A communication system that synchronizes time distribution among a plurality of system components, wherein each said component comprises a time sub-system clock, said system comprising:
- a terrestrial network, wherein one of said components includes a satellite gateway network time protocol (NTP) server having said time sub-system clock synchronized with a master clock; and
- a mobile network comprising a plurality of said components operating in a hierarchical fashion, one of said components including a control sub-system (CS) NTP server adapted to communicate with said satellite gateway NTP server, wherein each said component time sub-system clock is adapted to:
  - boot up such that execution of a first NTP sub-program for making incremental changes to said component time sub-system clock is delayed;
  - initially synchronize said component time sub-system clock with a respective parent component time sub-system clock; and
  - maintain synchronization of said component time sub-system clock with said respective parent component time sub-system clock.

8. The system of claim 7, wherein to initially synchronize each said component time sub-system clock, each said component is further adapted to execute a second NTP sub-program for making greater than incremental changes to each said component time sub-system clock.

9. The system of claim 8, wherein to initially synchronize each said component time sub-system clock, each said component is further adapted to:
- remain idle for a predetermined amount of time if execution of said second NTP sub-program fails to initially synchronize each said component time sub-system clock with said respective parent component time sub-system clock; and
- repeat execution of said second NTP sub-program after remaining idle for the predetermined amount of time.

10. The system of claim 9, wherein to initially synchronize each said component time sub-system clock, each said component is further adapted to:
- repeat remaining idle for a predetermined amount of time and executing said second NTP sub-program after remaining idle for the predetermined amount of time until initial synchronization with said respective parent component time sub-system clock is accomplished.

11. The system of claim 10, wherein to maintain synchronization of said component time sub-system clock with said respective parent component time sub-system clock, each said component is further adapted to iteratively execute said first NTP sub-program once initial synchronization with said respective parent component time sub-system clock has been accomplished.

12. The system of claim 8, wherein to maintain synchronization of said component time sub-system clock with said respective parent component time sub-system clock, each said component is further adapted to iteratively executing said first NTP sub-program if the initial synchronization is successful.

13. The system of claim 7, wherein to maintain synchronization of each said component time sub-system clock with said respective parent component time sub-system clock, each said component is further adapted to iteratively execute said first NTP sub-program.

14. A method for synchronizing time distribution of a mobile network that includes a plurality of network components, wherein each said component includes a time subsystem clock that is updated using a network time protocol (NTP) program, and wherein a first NTP sub-program is used for making incremental changes to each said component time sub-system clock, said method comprising:
- operating said components in a hierarchical fashion;
- booting up all said components such that execution of said first NTP sub-program is delayed;
- iteratively executing a second NTP sub-program for making greater than incremental changes to each said component time sub-system clock until each said component time sub-system clock establishes an initial synchronization with a parent component time sub-system clock; and
- iteratively executing said first NTP sub-program once initial synchronization is established such that each said component time sub-system clock maintains synchronization with said parent component time sub-system clock.

15. The method of claim 14, wherein iteratively executing said second NTP sub-program comprises remaining idle for a predetermined amount of time if execution of said second NTP sub-program fails to initially synchronize each said component time sub-system clock with said respective parent component time sub-system clock.

16. The method of claim 15, wherein iteratively executing said second NTP sub-program further comprises repeating the execution of second NTP sub-program after remaining idle for the predetermined amount time.

17. The method of claim 16, wherein iteratively executing said second NTP sub-program further comprises repeating the remaining idle for a predetermined amount of time and the executing of said second NTP sub-program until initial synchronization with said respective parent component time sub-system clock is accomplished.

* * * * *